(12) United States Patent  
Kennedy

(10) Patent No.: US 7,174,720 B2
(45) Date of Patent: Feb. 13, 2007

(54) COOKER UTILIZING A PELTIER DEVICE

(76) Inventor: Brian C. Kennedy, 2711 N. Maple Rd., Ann Arbor, MI (US) 48103

( * ) Notice: Subject to any disclaimer, the term of this patent is extended or adjusted under 35 U.S.C. 154(b) by 403 days.

(21) Appl. No.: 10/779,919

(22) Filed: Feb. 17, 2004

(65) Prior Publication Data
US 2005/0005612 A1 Jan. 13, 2005

Related U.S. Application Data

(60) Provisional application No. 60/484,984, filed on Jul. 7, 2003.

(51) Int. Cl.
F25B 21/02 (2006.01)
(52) U.S. Cl. ............................. 62/3.3; 99/470
(58) Field of Classification Search ............ 62/3.1–3.3, 62/3.6, 411, 452, 457.6, 457.9; 99/468, 470, 99/484; 219/385, 439, 620
See application file for complete search history.

(56) References Cited

U.S. PATENT DOCUMENTS

| 2,696,775 | A |  | 12/1954 | Dean |
| 3,445,039 | A |  | 5/1969 | Brodsky et al. |
| 3,608,627 | A |  | 9/1971 | Shelvin |
| 4,097,709 | A |  | 6/1978 | Bächtold et al. |
| T973,013 | I4 |  | 8/1978 | Ferrara et al. |
| 4,156,454 | A |  | 5/1979 | Skala |
| 4,250,959 | A |  | 2/1981 | Spasojevic |
| 4,355,521 | A |  | 10/1982 | Tsai |
| 4,413,171 | A |  | 11/1983 | Klammers |
| 4,591,683 | A |  | 5/1986 | Eke |
| 4,626,662 | A |  | 12/1986 | Woolf |
| 4,823,554 | A | * | 4/1989 | Trachtenberg et al. ........ 62/3.3 |
| 4,837,414 | A |  | 6/1989 | Edamula |
| 4,847,722 | A |  | 7/1989 | Bennett |
| 4,880,954 | A |  | 11/1989 | Bennett et al. |
| 4,881,590 | A |  | 11/1989 | Meier |
| 4,884,626 | A |  | 12/1989 | Filipowski |
| 4,917,076 | A | * | 4/1990 | Nadolph et al. ......... 126/375.1 |
| 5,060,479 | A | * | 10/1991 | Carmi et al. .................. 62/3.62 |
| 5,086,693 | A |  | 2/1992 | Tippmann et al. |
| 5,201,364 | A |  | 4/1993 | Tippmann et al. |

(Continued)

FOREIGN PATENT DOCUMENTS

JP 9-108096 A * 4/1997

(Continued)

OTHER PUBLICATIONS

U.S. Appl. No. 60/060,955, filed Oct. 1997, Brayton et al.

(Continued)

Primary Examiner—Mohammad M. Ali
(74) Attorney, Agent, or Firm—Dobrusin & Thennisch PC

(57) ABSTRACT

The present invention includes an appliance that has a cook vessel and a Peltier device. The Peltier device may have a motive heat distribution system on its waste side. The active side of the Peltier cools and heats the cook vessel in the absence of a motive heat distribution system. The present invention may also operate in the absence of an extraneous temperature regulation system. Methods of cooling and heating food are also part of the invention.

19 Claims, 1 Drawing Sheet

U.S. PATENT DOCUMENTS

| | | | |
|---|---|---|---|
| 5,280,748 A | 1/1994 | Pardo | |
| 5,321,229 A | 6/1994 | Holling et al. | |
| 5,325,766 A | 7/1994 | Mareels | |
| 5,351,745 A | 10/1994 | Park | |
| 5,375,508 A | 12/1994 | Knepler et al. | |
| 5,401,940 A | 3/1995 | Smith et al. | |
| 5,404,935 A | 4/1995 | Liebermann | |
| 5,421,246 A | 6/1995 | Tippmann et al. | |
| 5,454,427 A | 10/1995 | Westbrooks et al. | |
| 5,477,778 A | 12/1995 | Kuwahara | |
| 5,477,915 A | 12/1995 | Park | |
| 5,482,729 A | 1/1996 | McKenzie et al. | |
| 5,503,300 A | 4/1996 | Prescott et al. | |
| 5,522,310 A | 6/1996 | Black, Sr. et al. | |
| 5,535,664 A | 7/1996 | Rokowski | |
| 5,566,856 A | 10/1996 | Fallen et al. | |
| 5,655,595 A | 8/1997 | Westbrooks, Jr. | |
| 5,674,425 A | 10/1997 | Hong | |
| 5,771,788 A | 6/1998 | Lee et al. | |
| 5,771,959 A | 6/1998 | Westbrooks, Jr. et al. | |
| 5,797,445 A | 8/1998 | Westbrooks, Jr. et al. | |
| 5,931,010 A | 8/1999 | Kim | |
| 5,941,077 A * | 8/1999 | Safyan | 62/3.3 |
| 5,949,412 A | 9/1999 | Huntsman | |
| 5,983,200 A | 11/1999 | Slotznick | |
| 6,028,521 A * | 2/2000 | Issachar | 340/624 |
| 6,032,574 A | 3/2000 | Brayton et al. | |
| 6,080,972 A | 6/2000 | May | |
| 6,244,165 B1 * | 6/2001 | Trombley et al. | 99/331 |
| 6,278,098 B1 * | 8/2001 | Han et al. | 219/681 |
| 6,279,464 B1 | 8/2001 | Lo et al. | |
| 6,279,568 B1 * | 8/2001 | Anthony | 126/381.1 |
| 6,293,107 B1 * | 9/2001 | Kitagawa et al. | 62/3.6 |
| 6,480,753 B1 | 11/2002 | Calder et al. | |
| 6,497,276 B2 | 12/2002 | Clark et al. | |
| 6,539,846 B2 * | 4/2003 | Citterio et al. | 99/468 |
| 6,549,818 B1 | 4/2003 | Ali | |
| 6,550,681 B1 | 4/2003 | Ross et al. | |
| 6,612,115 B2 * | 9/2003 | Luo | 62/3.6 |
| 6,619,045 B1 * | 9/2003 | Clark | 62/3.6 |
| 6,651,445 B1 * | 11/2003 | Clark et al. | 62/3.6 |
| 6,658,858 B1 * | 12/2003 | Thompson et al. | 62/3.6 |
| 6,763,665 B2 * | 7/2004 | Clark et al. | 62/3.6 |
| 2001/0004863 A1 | 6/2001 | Simeray et al. | |
| 2003/0070789 A1 | 4/2003 | Mueller | |
| 2003/0075538 A1 | 4/2003 | Kish et al. | |

FOREIGN PATENT DOCUMENTS

| | | |
|---|---|---|
| JP | 9108096 A2 | 4/1997 |
| JP | 10-127487 A * | 5/1998 |
| JP | 2002364980 A2 | 8/2001 |
| JP | 2002-364980 A * | 12/2002 |

OTHER PUBLICATIONS

U.S. Appl. No. 60/096,785, filed Aug. 1998, Trombley et al.

* cited by examiner

COOKER UTILIZING A PELTIER DEVICE

CLAIM OF PRIORITY

This application claims the benefit of U.S. Provisional application 60/484,984, filed on Jul. 7, 2003.

FIELD OF THE INVENTION

The present invention relates to an appliance that includes a Peltier device that provides both heating and cooling of food.

BACKGROUND OF THE INVENTION

As lifestyles become more hectic, there is an ever-increasing demand for time saving devices in the kitchen. One desirable technique is to prepare a meal the night before and put it in an oven or slow cooker at the appropriate time. This presents several problems, not the least of which is that one has to be home and remember to put the meal in the oven or slow cooker. For many decades, oven timers have easily dealt with these problems, but left the uncooked meal sitting at room temperature for a number of hours before the cooking process was started. Leaving uncooked food, especially meats, for too long a period of time is unsafe.

Consequently, combination appliances were created that included both a cooking element and a refrigeration element. These elements, however, were separate from each other; creating complex devices that were expensive to manufacture and difficult to maintain. For example, a microwave has been combined with a plumbed refrigeration system. Another combination has been a resistive heating element combined with a plumbed refrigeration system.

Peltier devices, also called thermoelectric devices, are solid-state devices that act as a heat pump when current is passed through the device. Essentially, during use, heat is pumped from one side of the Peltier device to the other. Consequently, one side tends to increase in temperature, the hot side, and the other side tends to decrease in temperature, the cold side. A very useful feature of the Peltier device is that reversing the direction of the current reverses the direction of heat flow and flips the hot and cold sides. For consistency, we herein adopt the often used labels "active" and "waste". The active side provides heating and/or cooling to a desired element through some thermal connection.

Recently, combination appliances utilizing Peltier devices have been produced. For example, a Peltier device in combination with microwave and/or resistance element heating is under development by TMIO. The Peltier device provides the cooling and the microwave provides the cooking. In this situation, the microwave element is necessary to achieve relatively short cooking times. By selecting different time-temperature profiles, different foods or combinations thereof, the need for the microwave disappears and it becomes an extraneous temperature regulation system that may be eliminated. Temperature regulation, used herein means the input or removal of thermal energy, heating or cooling, to achieve a desired temperature.

Other systems are primarily combinations of freezers and defrosters where a plumbed refrigeration system is utilized to freeze food and the Peltier devices provides heat to thaw the food in preparation for cooking. In either the heating or cooling situation, it would be desirable to eliminate the extraneous temperature regulation system (e.g. a microwave module or a plumbed refrigeration system) to an appliance that is cost effective to manufacture and maintain.

One perceived drawback of Peltier devices is that the heating/cooling (i.e. temperature regulation) is concentrated in one spot and thus may create undesirable thermal gradients. To overcome this problem, active side distribution systems have been included in appliances that utilize Peltier devices. These distribution systems typically include a working fluid, water or air for example, that is moved from the Peltier device to the volume of interest (e.g. the cook vessel) via pumps or fans and may be called active side motive distributions systems. The uneven temperature regulation problem has also been solved through the use of the extraneous temperature regulation systems described above. For example, a plumbed refrigeration system can be routed so as to provide relatively even cooling. It would be desirable to eliminate such an extra system.

Another desirable feature would be the ability to modify the cook timeline from a remote location. For example, when plans change, there is no way of preventing preset operations to occur. Thus, if plans change the food may not be in the desired condition at a later (earlier) time.

The inventor has recognized solutions to one or more of the above-mentioned problems.

SUMMARY OF THE INVENTION

The present invention includes an appliance that has a cook vessel and a Peltier device. The Peltier device may include a motive heat distribution system on its waste side. The active side of the Peltier cools and heats the cook vessel in the absence of a motive heat distribution system. The present invention may also operate in the absence of an extraneous temperature regulation system. Methods of cooling and heating food are also part of the invention.

BRIEF DESCRIPTION OF THE DRAWINGS

In the drawings:

FIG. 2 shows a cross-sectional view on line B—B of FIG. 1a.

DETAILED DESCRIPTION

Figure 1:
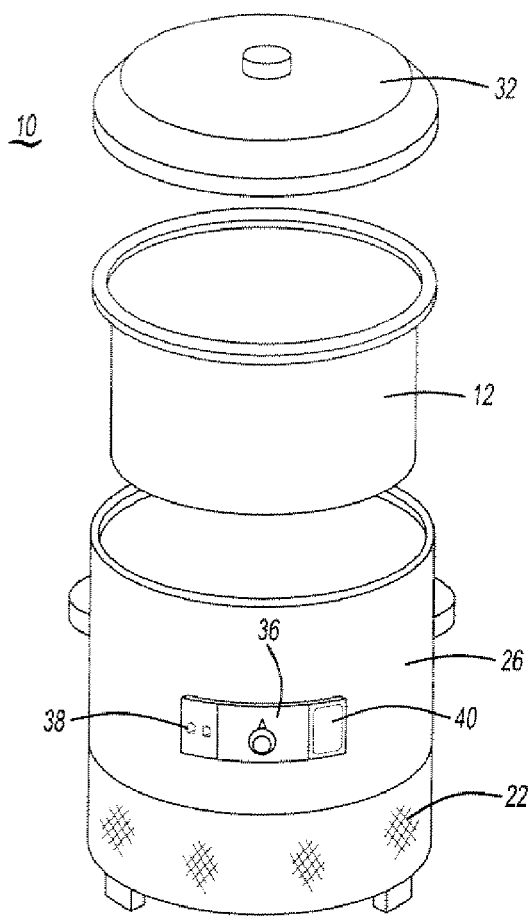
FIG. 1 shows a perspective view of one embodiment of the present invention.
Figure 2:
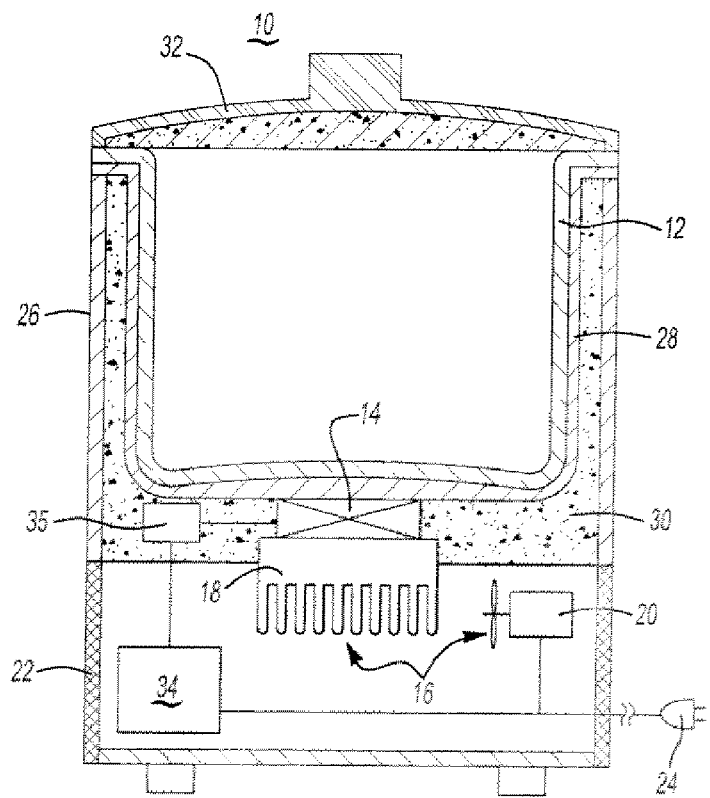

The present invention comprises an appliance that may both cool and heat food. As seen in FIGS. 1–2, the appliance 10 includes a cook vessel 12 and at least one Peltier device 14. The appliance may also include a motive waste side distribution system 16, which may include one or more of a heat sink 18, a fan 20, an air permeable protective cover 22 and/or ducting. A power source 24 provides the necessary energy operate the Peltier device. Optionally, the cook vessel, the Peltier device and the rest of the components may be contained with a housing 26, where the housing may contain an inner lining 28, insulation 30 and cover 32. The appliance may also contain a control unit 34, one or more sensors (shown schematically at reference numeral 35) such as temperature, current and/or voltage sensors, an interface such as a user interface 36 or a remote interface 38, a display 40 or combinations thereof.

Cooling, as used herein, refers to decreasing the temperature of the cook vessel and/or its contents to a temperature less than the present temperature. Heating used herein refers to increasing the temperature of the cook vessel and/or it contents to a temperature greater than the present temperature. In a preferred embodiment, the appliance may increase the temperature to a degree sufficient to provide edible warm food.

Any vessel that remains intact at the operational temperatures of the appliance may be suitable for use as a cook vessel. The cook vessel is preferably made of a material that is lightweight and cost effective that adequately conducts heat to or from the contents of the cook vessel. Aluminum is a preferred material. Other materials may also be suitable for the cook vessel such as glass, ceramic, laminates or plastic.

Combination cook vessels may also be suitable, e.g. a metal vessel with a plastic non-stick coating on its food contacting surfaces. Alternately, a layer of fabric or foam insulation may be contained within the walls of the cook vessel.

Preferably, the cook vessel is removable, thus easing cleaning and for other uses. In one preferred embodiment, the bottom of the cook vessel is not planar and thus has a curve to it. This aids in heat distribution and resists warping overtime; warping can detrimentally effect the position of the cook vessel and the Peltier relative to one another (as described below), leading to reduced heat transfer.

Optionally, the vessel will also include a cover to minimize heat transfer and retain moisture during operation. The cover also keeps out contaminants. The cover may be latched and/or hinged to the housing or cook vessel.

Any Peltier device may be utilized in the present appliance, without regard to size, shape, composition, power rating or other characteristic. Preferably, the selected Peltier device will be able to achieve a temperature in the cook vessel in the range of 0° C. to 150° C. In one preferred embodiment, the temperature of the Peltier device is about 90° C. Cost effective Peltier devices that achieve this temperature range are currently available in commercial quantities.

In addition to a single Peltier device, several Peltier devices may be included in the appliance. Such a situation permits spaced placement of the Peltier devices about the cook vessel, which in turn may provide more consistent temperature regulation (i.e., less of a thermal gradient from one location in the cook vessel to another location in the cook vessel).

The Peltier device may be located anywhere within the appliance. In a preferred embodiment, a single Peltier device is located underneath the base or bottom of the cook vessel. In another embodiment, in addition to the base peltier device, one or more peltier devices may be located on the walls of the inner lining.

The cook vessel and Peltier device are located relative to one another within the appliance such that a motive distribution system (e.g. a system that moves a thermal transfer fluid) is not required to provide temperature regulation to the cook vessel. In one preferred embodiment, the Peltier device will contact the cook vessel directly. In another embodiment, the Peltier device will be spaced apart from the cook vessel. In still another embodiment, the Peltier device will be connected to the cook vessel by a thermally conductive material or other non-motive heat distribution system. In a preferred embodiment, the Peltier device is conductively coupled to the cook vessel by one or more thermally conductive materials. One preferred implementation includes an inner lining of the housing separating the cook vessel from the Peltier device. In another preferred embodiment, an aluminum interface plate is used in combination with the inner lining to conductively couple the Peltier device to the cook vessel, where the interface plate is located between the Peltier device and the inner lining. While solid thermally conductive materials are preferred, highly viscous liquids (e.g. gels or greases) may also be suitable. In addition, other materials may be used such as thermal grease or adhesive to attach the Peltier device to the interface plate or the inner lining.

The number and arrangement of the Peltier devices may be selected to permit the elimination of an extraneous temperature regulation system.

By eliminating an active side motive distribution system, the complexity of the appliance is greatly reduced, thus reducing the cost of manufacture, as well increasing the reliability of the appliance. The use of a thermally conductive couple or a like device between the Peltier device and the cook vessel (e.g. the inner lining and/or the interface plate) would maintain the reduced complexity of the appliance while also potentially offering more consistent temperature regulation of the cook vessel.

The waste side distribution system provides for a method to improve the efficiency of Peltier device with limited increases in complexity or cost. The waste side distribution system is used during cooling to transfer heat to the ambient air and in the heating mode, to stabilize the waste side temperature. While a plumbed system or a system including a liquid thermal transfer medium may be utilized to transfer waste side heat to ambient, a less complex system is preferable. For example, a system that utilizes ambient air, a heat sink and/or a fan would provide a cost effective and straightforward heat removal system. Ducting may be utilized to provide an intake and an exhaust for the distribution system and to route the air over the heat sink. Alternately, a mesh or other air permeable structure may be used to enclose the heat sink, fan and/or other components of the appliance.

The appliance typically will include a housing, which brings the components of the appliance together into a convenient package. The housing may include insulation to increase the thermal efficiency of the appliance or otherwise make the appliance suitable for consumer use (e.g. sound deadening insulation.).

The power source for the appliance preferably draws power from a wall socket; however, other power sources may be utilized, such as batteries, fuel cells or other portable sources of power.

The control unit provides operational mode selection as a function of time for the appliance. Typically, the predetermined operational modes which can include cooling, heating, cooking, refrigeration, temperature hold are set to operate for pre-selected durations at pre-selected times. The control unit may also receive input from a variety of sensors including temperature, current and voltage sensors, as well as issuing signals to the interface.

The appliance includes one or more interfaces. A user interface permits the user to program the appliance while at the appliance. A remote interface permits the user to attach to (e.g. plug-in a computer cable) or otherwise communicate with (e.g. wirelessly) the appliance when the user is not at the appliance. An appliance may contain both a user interface and a remote interface. The control unit may receive inputs or instructions from the interface.

In one embodiment of the interface, the user programs the appliance, including the start time and stop time and, optionally, the temperature at the user interface, which in turn transmits the instructions to the control unit. The user interface may be as simple as manual control without a timer or an electromechanical timer. Mechanical interface components (e.g. dial, sliders or the like) may also be used for selecting the temperature. The functions of the user interface may be combined into one component (e.g. one dial) or the functions may be separated into individual components (e.g. a dial for the timer and a dial for temperature). In another embodiment, the user interface may include an alphanumerical keypad, a touch pad or another electronic input device used for programming the operation of the appliance.

In another embodiment of the interface, a remote interface may be utilized to permit instructions to be sent to the control unit from a remote location. The remote interface may include one or more ports to accept a phone line or a computer cable that allow wireline communication with a device located remotely. The remote interface may also include a wireless communication module, no matter what part of the electromagnetic spectrum is utilized to transmit the signals (e.g. IR, RF, Bluetooth, cellular, Wi-Fi or the like). Communication transmitted through the power supply may also suitably be used to connect to a remote device.

Suitable devices located remotely include any device capable of issuing instructions that may be transmitted to the appliance. For example, a programmable computer, a telephone (cellular or landline), a remote control, combinations thereof or the like may be used.

Preferably, the remote interface uses standard communications protocols (e.g. TCP/IP), standard communications devices (e.g. modem, Ethernet card, wireless card), and communications networks (e.g. the internet or other packet switched network or the public switched telephone network). Such a remote interface permits a user to change the instructions to the appliance without having to be in the same location as the appliance, whether the appliance is across the room, in the next room, across the street or across the country from the device located remotely. As well as receiving instructions, the remote interface may be used to report information regarding the current state of the appliance including temperature, time remaining or whether a fault or other error has occurred.

The appliance may include a display to report the current conditions such as temperature, time remaining or whether an error has occurred. This display may also include a visual or auditory cue that an error has occurred, that the cooking cycle has begun or ended or that any other noteworthy event has happened.

Operating the appliance is straightforward. Uncooked food is placed in the cook vessel, which in turn is placed in the housing and near to the Peltier device. Power is supplied to the Peltier device and the temperature of the cook vessel is regulated. An unlimited number of time and/or temperature profiles maybe used to achieve the desired results, whether that is cold storage, a hot meal, or refrigerated leftovers. One preferred temperature profile includes cooling from ambient temperature to a desired low point (e.g. 2–4° C.) where the temperature is held until heating is initiated. Heating is continued until the food is sufficiently cooked to be edible. At this point, heating may be stopped altogether, cooling may be initiated or a steady temperature may be achieved. In addition, temperature profiles may be steady increases or decreases, stepped increases or decreases or maintaining a particular temperature.

It will be further appreciated that functions or structures of a plurality of components or steps may be combined into a single component or step, or the functions or structures of one-step or component may be split among plural steps or components. The present invention contemplates all of these combinations. Unless stated otherwise, dimensions and geometries of the various structures depicted herein are not intended to be restrictive of the invention, and other dimensions or geometries are possible. Plural structural components or steps can be provided by a single integrated structure or step. Alternatively, a single integrated structure or step might be divided into separate plural components or steps. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

What is claimed is:

1. An appliance comprising:
    a temperature regulation system comprising a convex portion and a Peltier device having an active side and a waste side
    a cook vessel in contact with the active side, the cook vessel comprising a removable lid and having a concave portion disposed at the bottom portion of the cook vessel matched to the convex portion of the temperature regulation system; and
    a waste side distribution system,
    wherein the Peltier is located underneath the cook vessel and the active side provides temperature regulation to the cook vessel.

2. The appliance of claim 1, wherein the convex portion is a thermally conductive material located between the Peltier and the cook vessel.

3. The appliance of claim 2, wherein the temperature regulation system consists essentially of the Peltier device and the thermally conductive material.

4. The appliance of claim 3, wherein the waste side distribution system comprises a heat sink.

5. The appliance of claim 4, wherein the waste side distribution system further comprises a fan.

6. The appliance of claim 5, further comprising a control unit having at least a timer.

7. The appliance of claim 6, further comprising a temperature sensor connected to the control unit.

8. The appliance of claim 7, further comprising a user interface.

9. The appliance of claim 8, further comprising an insulated housing in which the cook vessel is removably accepted.

10. A method comprising:
    contacting a cook vessel, having a concave portion, with a Peltier device wherein the Pelter device is located underneath the cook vessel, wherein a thermally conductive material having a convex portion matched to the concave portion of the bottom part of the cook vessel separates the Peltier from the cook vessel; and
    cooking uncooked ingredients in the cook vessel until edible.

11. The method of claim 10, further comprising controlling the cooking with a control unit having a user interface, a remote interface or combinations thereof.

12. The method of claim 10, further comprising supplying a motive thermal transfer medium to a waste side of the Peltier device.

13. The method of claim 10, further comprising refrigerating the cook vessel before the cooking step.

14. The method of claim 10 further comprising supplying a liquid thermal transfer medium to the Peltier device.

15. The method of claim 11 further comprising refrigerating the cook vessel after the cooking step.

16. The appliance of claim 2 further comprising a plurality of Peltier devices in contact with walls of the cook vessel.

17. The appliance of claim 2 further comprising a latch or a hinge connecting the removable lid to the cook vessel.

18. The appliance of claim 8 further comprising a remote interface.

19. The appliance of claim 3 wherein the waste side distribution system comprises a plumbed system or a liquid thermal transfer medium.

* * * * *